March 6, 1956 E. F. PULS 2,737,058
AUTOMATIC CONTROL DEVICE FOR THE GEAR TRANSMISSION
OF AN INTERNAL COMBUSTION ENGINE Filed May 13, 1952 2 Sheets-Sheet 1

Inventor
Erich Friedrich Puls
By
Munn, Liddy & Nathanson
Attorneys

United States Patent Office 2,737,058
Patented Mar. 6, 1956

2,737,058
AUTOMATIC CONTROL DEVICE FOR THE GEAR TRANSMISSION OF AN INTERNAL COMBUSTION ENGINE

Erich Friedrich Puls, Paris, France

Application May 13, 1952, Serial No. 287,537

4 Claims. (Cl. 74—472)

This invention relates to an automatic control device for a power transmission mechanism in which the successive speed ratios may be controlled by the successive positions of a same movable control member, said control member acting for example upon the gears by the means of fluid-pressure operated pistons, or of control circuits and electromagnets. In particular, such an automatic control device may be advantageously used in combination with a transmission of the type disclosed in the co-pending patent application, Serial Number 95,284, entitled: "Power Transmission Mechanism With a Differential Device" of which this application is a continuation-in-part.

According to the invention, the change of speed is effected either automatically or at will with a hand operated gear selector.

This automatic control device is designed and adapted to be responsive to the amount of accelerator movement of a control element of an internal combustion engine, wherein both a centrifugal governor actuated in rotation by the driven shaft, and a control lever of the fuel supply of the driving motor coöperate upon a gear ratio controlling member.

Automatic control devices were known in which a governor was connected to an oil distributing valve in a resilient manner, that is with springs interposed therebetween, and in which an accelerator pedal was connected to the governor so as to shift back the governor balls towards the axis of rotation of said governor when the accelerator pedal was depressed, in order to adapt the engine torque to the automatic control device.

According to the invention, a governor driven by the output shaft of the gear is rigidly connected to a movable control member of the gear, in such a way that the displacements of the control member are at every moment equal to the displacements of the governor speed-responsive member. This renders the control very accurate and reliable, and besides more simple. The governor, during its expansion, has to overcome the resistance of a set of springs, these springs resting on a lever or cam adapted to increase their tension when fuel supply to the engine is increased, and inversely. A novelty of the device is the provision of a set of springs of different lengths and tensions which allow the said control member of the gear to be moved in steps, and not gradually. It is to be understood that a stepwise motion is preferred when used on a device that operates changes of gear ratio in steps, any gradual motion and consequently any indefinite position being not desirable, especially in a gear box provided with a plurality of planetary sets and in which the governor has to control for instance four gear ratios and consequently has to move in steps.

The selector lever according to the invention brings the advantage of a direct interconnection with the gear ratio operating member, which is, for example, a pressure oil distributor piston. This arrangement is most desirable and reliable for motor cars.

Two embodiments of a mechanism according to the invention are illustrated diagrammatically by way of example in the appended drawing, in which.

Figure 1:
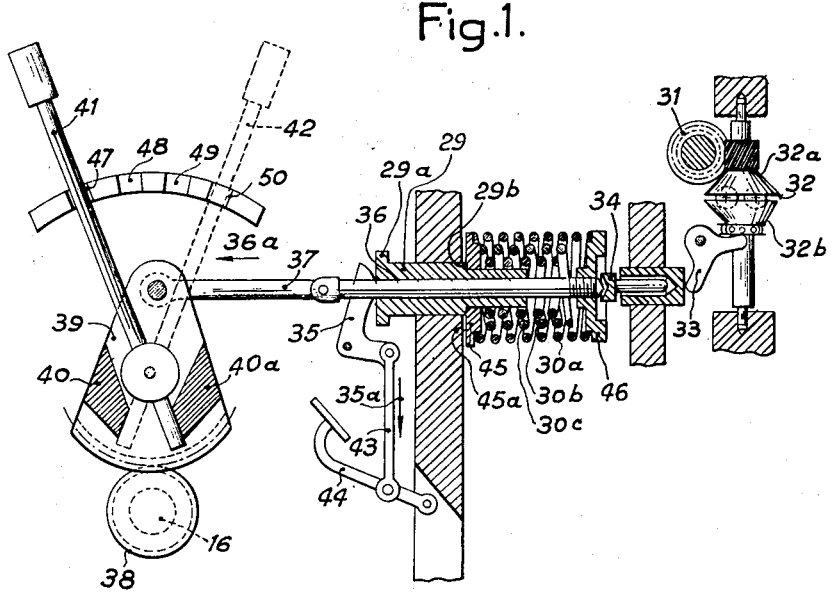
Fig. 1 illustrates an automatic speed regulator for a four-speed transmission.

The output shaft 31 of the gear transmission of an internal combustion engine drives a centrifugal governor 32 provided with balls guided in a cage and destined to be thrown out from the axis of rotation of the governor when this latter is being rotated. This cage comprises two cones 32a and 32b, the first one being fixed to the spindle of the governor, the second one being slidably mounted on said spindle so as to be repulsed by the balls away from the other cone whenever the speed of rotation comes to increase. This speed-responsive cone 32b transmits its motion to a toothed sector 39 which is a pivoted control member of the gear mechanism of the transmission, this control member actuating another member 16, which is for example a pressure oil distributor, adapted for selectively locking or coupling different members 16a of the gear so as to provide the successive ratios when it is being shifted in one determined direction. The motion of the cone 32b is transmitted to the toothed sector 39 through a bell crank lever 33 repulsed by said cone 32b, a push member 34 actuated by said lever 33, a slide-rod 36 repulsed by the push member 34, a connecting member 37. The toothed sector 39 meshes with a pinion 38 firm with the distributor 16. In this way, no resilient member is interposed between the speed-responsive cone 32b of the governor and the toothed sector 39, that is to say that the speed-responsive member of the governor is rigidly and not yieldingly connected to the control member.

A sleeve 29 is slidably mounted on the slide-rod 36. This sleeve is provided with an annular shoulder 29a adapted for limiting its sliding in the direction of the push member 34, and with another shoulder 29b against which an annular plate 45 is in resting contact. A fixed stop 45a is provided for the plate 45. The end of the slide member 36 adjacent the push member 34 is provided with a plate 46. A set of three compression springs 30a, 30b, 30c, nested in one another are arranged around the push member 36 between the plates 45 and 46. These springs have staggered lengths and strengths, the spring 30a being the longer and the weaker one.

A bent lever 35 having its end in resting contact with the end of the sleeve 29 adjacent to the shoulder 29a is connected by a rod 43 with the fuel supply control pedal 44 which is connected with the carburetor 44a of the internal combustion engine, in such a way that the sleeve 29 is repulsed by the bent lever 35 towards the plate 46 and the push member 34 whenever the fuel admission is increased.

A hand operatable lever 41 is freely pivoted about the axis of the toothed sector 39, between two stops 40 and 40a firm with said sector. Four fixed locking members 47, 48, 49, 50 are adapted to receive the lever 41 and to hold it in four respective positions. These positions of lever 41 are those for which its short arm is in contact with the stop 40 of the sector 39 when this latter is in one of its speed positions. In this way, when the governor 32 is being rotated at an increasing speed, the speed-responsive member 32b acts upon the slide rod 36 in the direction indicated by arrow 36a, and shifts thus the toothed sector 39 and the distributor 16 towards the higher-speed positions. Correlatively, the springs 30a, 30b, 30c are compressed between the plates 46 and the plate 45, this latter resting either on the shoulder 29b of the sleeve 29 or on the fixed stop 45a. When the speed of the driven shaft is being continuously increased, the motion of the slide rod 36, the sector 39 and the distributor 16 is effected stepwise, due to the different lengths and strengths of these different springs. These lengths and strengths are predetermined in such a manner that the different steps of the motion of sector 39 and distributor 16 correspond to the respective ratio-positions of the control member 39.

Correlatively, the compression of the springs 30a, 30b, 30c is increased in proportion as the slide 29 and its plate 45 are repulsed by the lever 35 and the accelerator pedal 44, that is inasmuch as said pedal 44 acts in the direction of the arrow 35a, for which the fuel admission is increased.

When the speed of the driven shaft 31 and of the governor 32 has been reduced enough to allow the set of springs to cause the speed-responsive cone 32b to be shifted back towards the cone 32a, the slide rod 36 which is pushed back by the set of springs pulls back the toothed sector 39 and the distributor 16 towards the lower speed positions. Such a return motion is equally performed stepwise owing to the different lengths and tensions of the springs of the set, the successive steps of this motion corresponding to the successive ratio-positions of the sector 39 and distributor 16.

It will be now assumed that the hand selector lever 41 is set in the fixed position corresponding to direct drive, that is in the position for which it is held by the locking member 47. When the driven mechanism is started by the engine and is being actuated at continuously increasing speeds, the governor 32 repulses stepwise the slide rod 36 in the direction of arrow 36a, and the toothed sector 39 is then shifted by said slide rod in counter-clockwise direction, until it reaches the direct drive position. In this position, the stop 40 comes to contact with the shorter arm of the lever 41. In any of its positions, the slide rod 36 is urged in the direction 36a by a force which is the difference between the thrust of the governor and the thrust of the set of springs, this latter thrust being an increasing function of the fuel admission.

If, at a high speed of the driven mechanism, it was attempted to shift lever 41 towards the position 42 in order to act upon the stop 40 and to shift thereby the sector 39 towards an underdrive, it would be necessary to overcome the force acting upon the slide rod 36. It results therefrom that a change towards a lower speed cannot be operated in too high speed conditions. This change will occur automatically and stepwise as soon as the force acting upon slide rod 36 will become less than the thrust of the set of springs.

If instead of being in engagement with the locking member 47, the lever 41 was, from the starting of the driven mechanism, in second-speed position, that is in engagement with the locking member 49, the stop 40 would come into contact with the shorter end of the lever 41 as soon as the sector 39 and the control member should come automatically to the second-speed position. In this way, the lever 41 acts as a stop for the tooth sector 39, and no further change of speed upwards can occur until the hand lever 41 is set into engagement with locking member 48 or with locking member 47, correspondingly respectively to the third speed and to the direct drive.

The stop 40a serves to push back automatically the lever 41 when unlocked towards the position 42 corresponding to first drive, whenever the speed of the governor comes to decrease.

Figure 3:
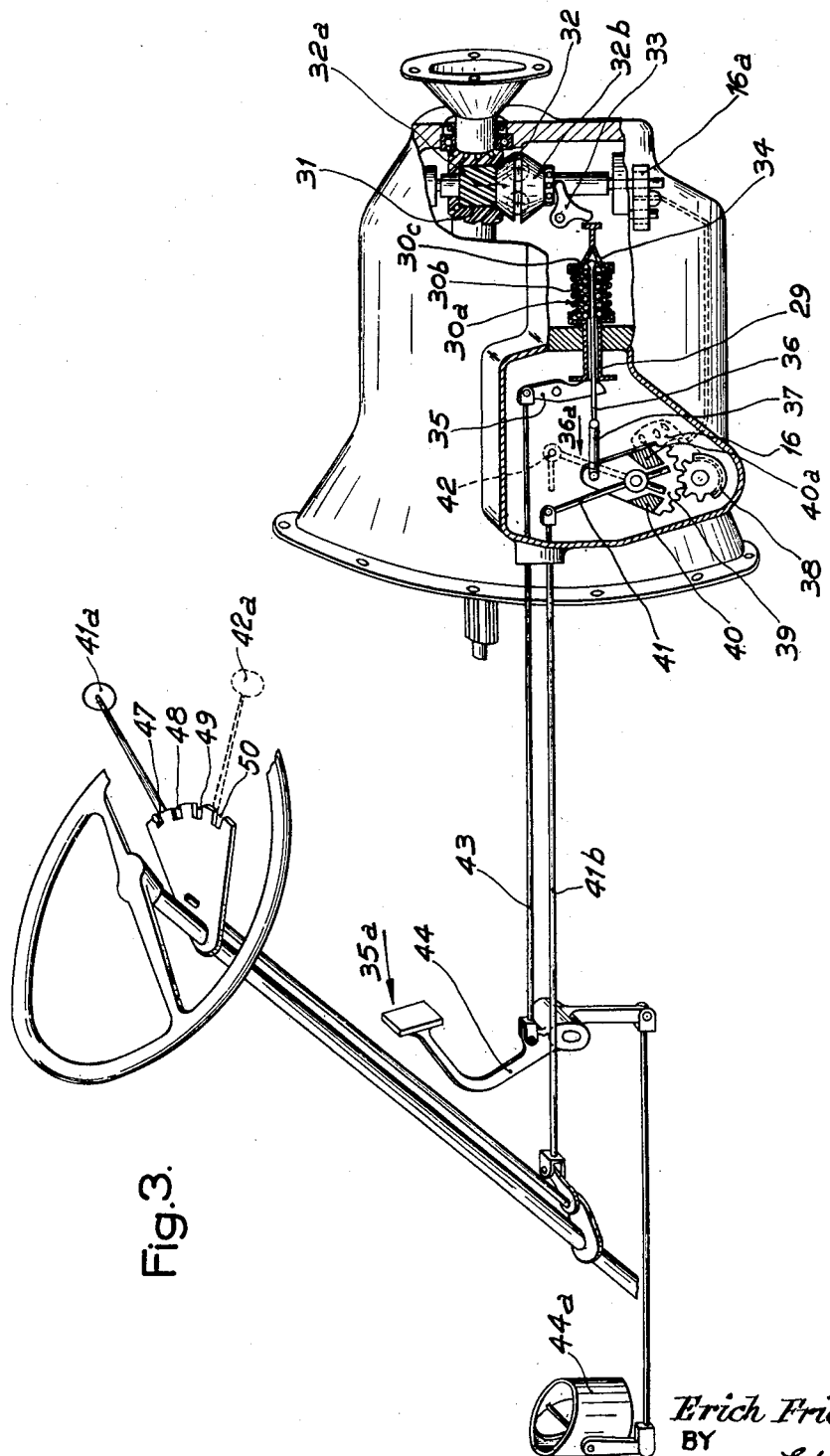
Fig. 3 illustrates a setting showing with what the present invention is associated, and in what manner the various elements are interconnected, some parts being shown in elevation, other parts being shown in section, and portions of some parts being broken away.

Fig. 3 illustrates that the segment having the locking members 47, 48, 49 and 50 may be mounted on the steering column, and that the lever 41 through the intervention of manually operable connections, generally designated 41b, may be moved into the desired positions, such as the high speed position 41a indicated in full lines in Fig. 3, and the low speed position 42a indicated in dotted lines in Fig. 3.

Figure 2:
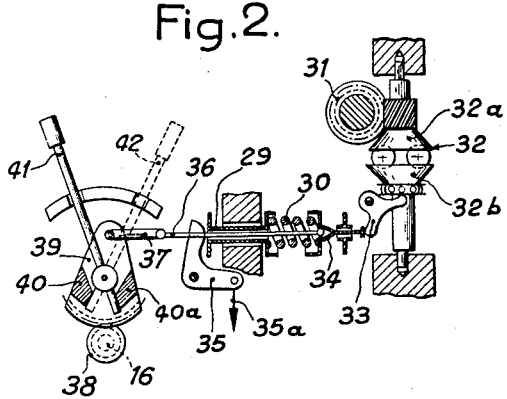
Fig. 2 illustrates an automatic speed regulator for a two-speed transmission.

The number of the springs of the set is equal to the number of the intervals between the different speeds. In the four-speed device as described hereinabove, three springs are provided. In a two-spaced mechanism, as represented in Fig. 2, a single spring 30 is necessary, and the lever 41 can be held in two positions corresponding to either speed.

The combination of a selector lever and of an automatic control device according to the invention results in a perfect safe control on changing towards lower speeds, and allows to utilize the engine as a brake at any time. Besides, changing too early towards higher speeds is prevented by the automatic control.

The rigid connection existing between the governor and the control member of the gear, that is the connection in which no yielding member is provided between said control member and said gear, has the advantage of setting the distributor into a position which corresponds exactly at every time to the position of the governor balls or masses, that is to the speed of the output shaft, and provides thus an accurate functioning of the automatic control device of the gear.

Besides, the provision of a slide member mounted coaxial with the slide rod and urged by coaxial springs nested in one another results in exerting without any friction the two counteracting forces depending respectively on the governor and on the fuel supply control device, that is depending on the speed of the driven mechanism and on the engine torque. The difference of these two counteracting actions is thus most accurately measured. It is always the accurate difference between these two forces which is transmitted to the control member of the transmission and which acts upon this latter.

The provision of the hand selector lever is very useful and reliable. This hand lever can be used at will, either for limiting the automatic displacement of the control member, or for suppressing all automatic operation when once locked on the control member.

What I claim is:

1. In combination with an internal combustion engine and with a gear transmission having a shiftable control member of which the successive positions correspond to the successive speeds of the transmission, a governor having a driven connection with the driven shaft of the gear transmission, a movable speed-responsive member on said governor, a movable rigid member having a driven connection with the speed-responsive member of the governor and a driving connection with the control member of the transmission in the direction in which said rigid member shifts said control member towards the higher speed positions when the rotation speed of the governor is increasing, a fuel admission control device for the engine, a shiftable member connected to said fuel admission control device, and at least one spring operatively associated at one end with said shiftable member in the direction in which the tension of the spring is increased when said shiftable member is displaced towards a position corresponding to an increased fuel admission position of the related control device and operatively associated at the other end with the aforesaid movable rigid member in the direction in which the tension of the spring is increased when said movable rigid member is displaced towards the higher speed positions of the control member of the transmission.

2. In combination with an internal combustion engine and with a gear transmission having a shiftable control member of which the successive positions correspond to the successive speeds of the transmission, a governor having a driven connection with the driven shaft of the gear transmission, a movable speed-responsive member on said governor, a slidable rigid member having a driven connection with the speed responsive member of the governor and a driving connection with the control member of the transmission, in the direction in which it shifts said control member towards the higher speed positions when the rotation speed of the governor is increasing, a shiftable member slidable on said rigid member according to the sliding direction of said rigid member, and at least one spring operatively associated at one end with said shiftable member in the direction in which the tension of the spring is increased when said shiftable member is displaced towards a position corresponding to an increased fuel admission position of the related control device and operatively associated at the other end with the aforesaid movable rigid member in the direction in which the tension of the spring is increased when said movable rigid member is displaced towards the higher speed positions of the control member of the transmission.

3. In combination with an internal combustion engine and with a gear transmission having a shiftable control member of which the successive positions correspond to the successive speeds of the transmission, a governor having a driven connection with the driven shaft of the gear transmission, a movable speed-responsive member on said governor, a movable rigid member having a driven connection with the speed-responsive member of the governor and a driving connection with the control member of the transmission in the direction in which said rigid member shifts said control member towards the higher speed positions when the rotation speed of the governor is increasing, a fuel admission control device for the engine, a shiftable member connected to said fuel admission control device, and a set of springs mounted for cooperation at their one end with said shiftable member in the direction for which their respective tensions are increased when said shiftable member is displaced towards a position corresponding to an increased fuel admission position of the related control device and mounted for cooperation at their other end with the aforesaid movable rigid member in the direction in which their respective tensions are increased when said movable rigid member is displaced towards the higher speed positions of the control member of the transmission, said springs being adapted for being successively set in tension during a continuous displacement of the aforesaid movable rigid member in relation to the aforesaid shiftable member in the one direction and for being successively set out of tension during a continuous relative displacement in the other direction.

4. In combination with an internal combustion engine and with a gear transmission having a shiftable control member of which the successive positions correspond to the successive speeds of the transmission, a governor having a driven connection with the driven shaft of the gear transmission, a movable speed-responsive member on said governor, a movable rigid member having a driven connection with the speed-responsive member of the governor and a driving connection with the control member of the transmission in the direction in which said rigid member shifts said control member towards the higher speed positions when the rotation speed of the governor is increasing, a fuel admission control device for the engine, a shiftable member connected to said fuel admission control device, at least one spring operatively associated at one end with said shiftable member in the direction in which the tension of the spring is increased when said shiftable member is displaced towards a position corresponding to an increased fuel admission position of the related control device and operatively associated at the other end with the aforesaid movable rigid member in the direction in which the tension of the spring is increased when said movable rigid member is displaced towards the higher speed positions of the control member of the transmission, a selector shiftably mounted on the control member of the transmission, a stop on said control member for said selector, and a plurality of fixed locking members adapted for locking the selector in different fixed positions in which said selector is in resting contact with the stop of the control member when this latter is in a respective speed-position.

References Cited in the file of this patent

UNITED STATES PATENTS

| | | |
|---|---|---|
| 2,352,212 | Lang et al. | June 27, 1944 |
| 2,365,204 | Martin et al. | Dec. 12, 1944 |
| 2,421,496 | Grieshaber et al. | June 3, 1947 |
| 2,443,084 | Rhodes | June 8, 1948 |
| 2,474,316 | May et al. | June 28, 1949 |
| 2,588,140 | McFarland et al. | Mar. 4, 1952 |

FOREIGN PATENTS

| | | |
|---|---|---|
| 676,634 | Great Britain | July 30, 1952 |
| 967,113 | France | Mar. 22, 1950 |